Figure 4:
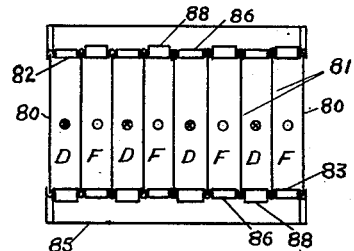

Aug. 13, 1940.  B. C. SHIPMAN  2,211,033
AIR COOLING AND CONDITIONING APPARATUS
Filed July 29, 1932  2 Sheets-Sheet 1

Fig. 1.

Inventor,
Bennet Carroll Shipman
by
his Atty.

Aug. 13, 1940.                B. C. SHIPMAN                2,211,033
                    AIR COOLING AND CONDITIONING APPARATUS
                    Filed July 29, 1932           2 Sheets-Sheet 2

Witnesses:                       Inventor:
Clara Wood Shipman.              Bennet Carroll Shipman
Charles E. Reith.

Patented Aug. 13, 1940

2,211,033

UNITED STATES PATENT OFFICE 2,211,033

AIR COOLING AND CONDITIONING APPARATUS

Bennet Carroll Shipman, San Mateo, Calif., assignor to Servel, Inc., New York, N. Y., a corporation of Delaware Application July 29, 1932, Serial No. 625,936

22 Claims. (Cl. 183—4)

It is the usual practice to effect cooling of air by the conventional type of refrigerating apparatus compressing, condensing and evaporating some refrigerant, removing excess moisture thereby and regulating the relative humidity by reheating the requisite amount. This necessitates a refrigerating equipment in addition to the circulating fans and ducts for the air. In certain cases where the air has a very low initial relative humidity, such as naturally exists in certain sections of the United States and also of other countries, cooling has been effected by humidifying such dry air without a refrigerating machine. The method, however, has certain drawbacks as no effective control of humidity can be had if definite temperatures are to be reached or maintained under varying conditions of the air.

The present practice of cooling air by humidification simply further saturates it by the amount requisite to reach the temperature desired, if that be feasible. The lowest temperature attainable by such a method is the wet bulb temperature and the air then is consequently 100% saturated, and in many cases unsuitable for use. No heat has been removed from the air by this method but only converted from sensible heat to latent heat, a certain amount of the heat of the air disappearing by evaporating a certain amount of water.

My invention relates to a method of cooling air by humidification but without increasing its absolute humidity until after its use unless desired. Consequently temperatures much below the wet bulb can be reached. The limiting temperature, in fact, is the dew point of the existing air. To accomplish this result I use a regenerative evaporative cooling process by which the effect is cumulative by including the space to be cooled in the circuit for flow of air subjected to the process. Dry air may be provided for the process by absorbing moisture from room air, i. e., recirculated air so that the air to be dehydrated may be at an absolute humidity below that of the atmosphere to permit of the necessary efficiency of absorption to effect the desired subsequent evaporative cooling of the air even when the absolute humidity of the atmosphere is above that of room air. The cooling apparatus can be readily combined with heating apparatus to make a year round conditioning equipment.

Figure 2:
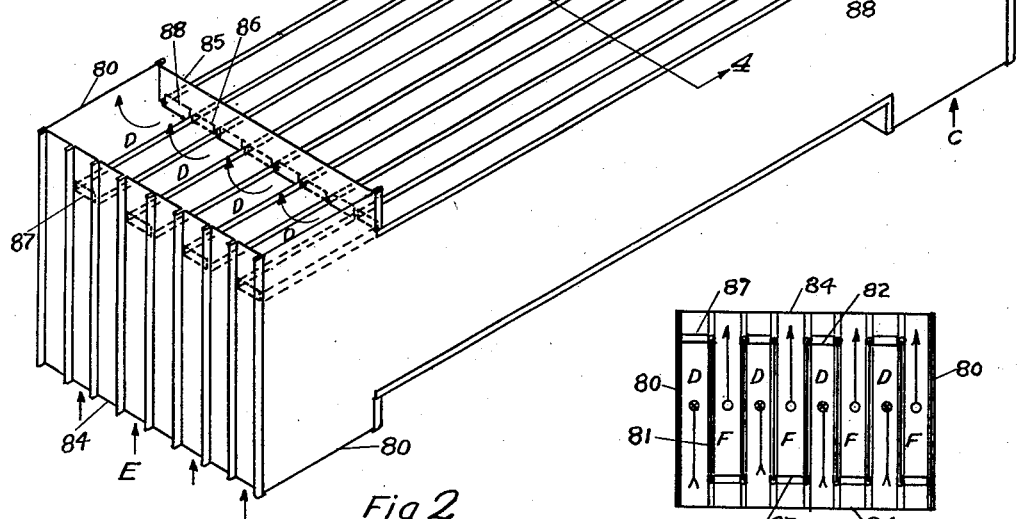
Figure 3:
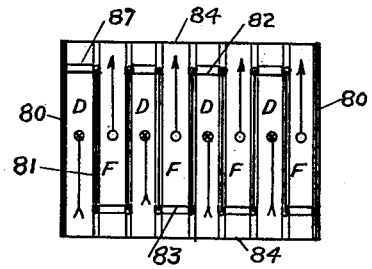
Figures 5, 6:
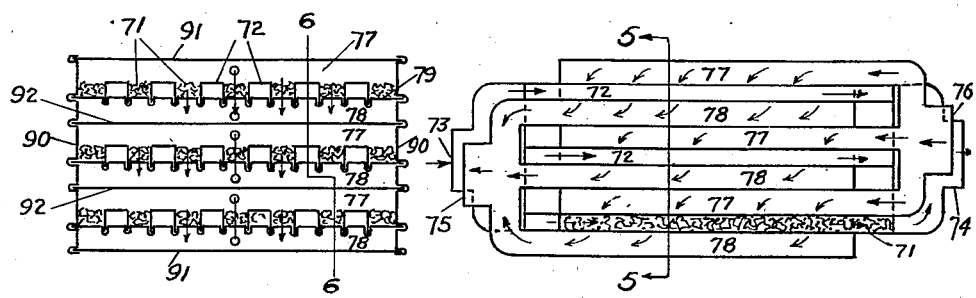

The invention together with other objects and advantages thereof will be more fully understood upon consideration of the following description and the accompanying drawings forming part of this specification and of which, Fig. 1 is a more or less diagrammatic view illustrating an air conditioning system embodying the invention, Fig. 2 shows a heat exchanger for use in the system shown in Fig. 1, Fig. 3 is a detail sectional view on line 3—3 in Fig. 2, Fig. 4 is a detail sectional view on line 4—4 in Fig. 2, Fig. 5 is a transverse sectional view of a dehumidifier for use in the system shown in Fig. 1 and is taken on line 5—5 of Fig. 6, and Fig. 6 is a longitudinal sectional view of the dehumidifier on line 6—6 of Fig. 5.

In Fig. 1 the dehumidifiers 52 and 53 are similar and comprise beds of adsorbent material, such as silica gel, charcoal, calcium chloride, etc., arranged in troughs 71 with suitably perforated bottoms. A type of suitable structure of the dehumidifiers is shown in Figs. 5 and 6. At least two dehumidifiers are provided for continuous operation, one adsorbing while the other is reactivating. The induction air is led from outside through duct 2 and from re-circulating duct 9 according to the position of damper 63 thence to duct 2b or 2c according to the throw of the dampers 54 and 55. As illustrated, it passes through dehumidifier 52 while dehumidifier 53 is being reactivated. In the dehumidifier the air becomes heated by the latent heat released from the condensation of the vapor therein and must be cooled considerably before it is suitable for use in any system of air conditioning. Heretofore such cooling has been effected by the use of water in pipe coils from a water supply system, such water thereafter being rejected to waste at considerable cost. By using my regenerative heat exchanger with multiple saturation the air from the dehumidifiers is cooled practically without cost, as the eduction air must be circulated anyhow. One pound of water used as a cooling medium will absorb only one B.t.u. per degree, whereas one pound of water used evaporatively as in the sprays will absorb approximately 1000 B.t.u.

From the dehumidifier the dried and hot air passes to the inductive inlet of the regenerative heat exchanger 50b continuously through it, and out through the duct 2a to the inlet of the fan 3. From the outlet of the fan it discharges through a humidifying chamber 13b and thence to ducts 24 and 8a, the relative proportions delivered to these ducts being determined by the position of the damper 64. That portion passing to duct 8a passes through a saturating spray chamber 13a and thence to eductive inlet of the regenerative heat exchanger 50b in counterflow direction to that of the induction air. The heat transfer from the induction air to the eduction air as it passes through a portion of the exchanger warms the latter from its wet bulb temperature at entrance thus lowering its relative humidity. By then diverting the eduction air from the exchanger into a spray chamber 51 and re-saturating it the temperature of this eduction air will be brought back to a new wet bulb temperature higher than the former one but still considerably below the temperature it had before saturation. After passing another section of the heat exchanger this process is repeated as many times as may be economically justified. In this way the eduction air will be maintained at a greatly lower average temperature than if it were passed through the exchanger without re-saturation. For instance, if eduction air entered the exchanger at 60° and 100% relative humidity and in the first pass were heated to 80° and 51% relative humidity, which corresponds to that increase in temperature, then by resaturating this 80° air its temperature will be brought back to approximately 67° and 100% relative humidity. Thus there will be a reduction of 13° in the temperature of the air entering the second pass. If the re-saturation were made more frequently, for example after 10° rises, the average temperature of the eduction air would be lower yet, but the frequency of these resaturations is an economic matter. However this method of multiple resaturation is very desirable especially with the present arrangement. The amount of induction air through the exchanger is generally greater than the amount of eduction air due to the diversion of some of the former to the conditioned space. Therefore with one straight pass through the exchanger for both airs the eduction air could not cool the induction air through the same range of temperature that the former heats. However by using the latent heat of water evaporation between a number of passes of the exchanger a smaller amount of eduction air can cool a greater amount of induction air through a greater temperature range than the former heats.

Adsorbing materials, as is well known, are capable of greater adsorption the lower their temperatures are maintained. I illustrate the use of the eduction air for this purpose, as it provides cooling without any additional cost of operation or, usually, of construction. After passing completely through the heat exchanger the eduction air is passed through another spray chamber 51 thus again reducing its temperature before admission to the dehumidifiers, thence through duct 8c to one or the other of the dehumidifiers according to the positions of the dampers 56 and 57. This eduction air is passed through the dehumidifiers in ducts 72 shown in Figs. 5 and 6, paralleling and forming the troughs 71 containing the adsorbent, thus continuously extracting heat from it and maintaining its capacity for adsorption over a longer period. After passing the dehumidifiers the eduction air is rejected through ducts 8b and 8 to the outside air.

The heat necessary to reactivate the adsorbent is provided by furnace 58 shown as heated by burner 60 although any suitable kind of heat production would do. This furnace also serves as a heat producer for the conditioned space when heating instead of cooling is necessary therein.

Heated gases from the furnace are led to either of the dehumidifiers 52 or 53 by ducts 58a or 58b according to the position of dampers 56 and 56a. These heated gases pass through the same ducts 72 that convey the eduction air, being used for the former when reactivating and for the latter when adsorbing, and pass similarly through ducts 8b and 8 to the outside air. A forced draft, not shown, for these hot gases makes more effective operation. The moisture driven out of the adsorbent by thus heating it above its adsorbent temperature escapes as vapor via ducts 2b and 2c respectively, into the duct 59 according to the positions of the dampers 54 and 55 and is delivered into the eduction duct 8 and thence to outside air.

When heating instead of cooling is required in the conditioned space, the dehumidifiers and the saturating sprays, except the humidifier 13b are no longer required. In this case the induction air partly from fresh air duct 2 and partly from re-circulating duct 9 according to the position of damper 63 passes through duct 2d by-passing the dehumidifiers by opening damper 67 and thence through heat exchanger 50b as before. Any required humidification is furnished in chamber 13b by water through valve 32 controlled by humidostat 33. The induction air is heated in the heat exchanger by the hot gases from the furnace 58 through duct 68 connecting to duct 8a leading to the heat exchanger, when dampers 56 and 56a are closed and damper 58c is opened. The sprays in chambers 13a and 51 are cut off by valves 65 which may be closed by the operation of a thermostat in the conditioned space when the temperature falls to a definite point therein. Damper 63 is adjustable for control of the amount of fresh air to be admitted, and damper 64 for control of the amount of air re-circulated. They can be controlled by a thermostat 66 to adjust for more re-circulated and less fresh air and vice versa according to the temperature conditions in the conditioned space.

Control of the temperature in the conditioned space when cooling may be effected by either or both of two ways—by controlling the amount of air circulated, and/or controlling the amount of humidification of the circulated air educted through the heat exchanger. Both methods are illustrated. Damper 69 in the suction conduit 2a of fan 3 regulated by mechanism 69a in turn controlled by thermostat 66 in the conditioned space allows more or less air to be delivered to said space proportionate to the amount of heat to be absorbed therefrom. Valves 65 in the discharge line to nozzles 13 in spray chambers 13a and 51 controlled by the thermostat 66 in the conditioned space allow more or less water to be delivered to said nozzles, thereby controlling the amount of humidification and therefore the temperature of the air passing therethrough. A relief valve 90 is provided between the discharge and suction of pump 10a to limit the pressure when the valves in the discharge lines may be closed. In this manner, when cooling, both the amount of air circulated and the amount of its humidification are regulated to control the temperature of the circulated air delivered to the conditioned space and the amount of heat removed therefrom. When heating, a valve 60a in the fuel line to burner 60 of furnace 58 controlled by thermostat 66 in the conditioned space 70 controls the amount of heating. While only one thermostat 66 has been illustrated for all these various purposes, it is evident that several would be preferable for different functions.

Figs. 2, 3 and 4 illustrate an inexpensive construction of a multicellular heat exchanger requiring a small number of parts. The two outside walls 80 are single flat sheets with T ends extending sufficiently to form the sides of sockets for reception of the connecting ducts. The intermediate walls 81 are each single flat sheets of the same length as the outside walls but with no T extensions at the ends. The top 82 and the bottom 83 are single sheets with U crimps running their full length and spaced suitably for the reception of the edges of the walls. The metal, where the crimps are formed, is preferably tinned as also at the edges of the walls. Thus when the walls are inserted in the crimps, the application of heat and pressure readily unites them by solder. Similarly also the end walls 84 are formed with U crimps for reception of the end edges of the walls and similarly united. To complete the other two sides of the sockets for reception of ducts, the end walls 84 are made the same length as the T extension of the outside walls 80 and a piece 85 U crimped only at the ends for engagement with the T extension of the outside walls closes the fourth side of the socket. These pieces 85 are notched out to fit over the ribs or crimps in the top and bottom walls 82 and 83. To close the imperfect joint still existing there, angle pieces 86 are soldered in at every alternate cell, every other alternate cell being closed by part of the wall 82 or 83 being cut between ribs and bent up at 88.

The flow and counterflow through the exchanger are indicated by arrows. In the sections shown in Figs. 3 and 4, where the flow is directly toward or away from the observer, flow toward is indicated by a circle and cross within it, and flow from is indicated by a plain circle. In Fig. 2, flow enters at the bottom at C and passes through cells D and leaves at the top. Therefore the top and bottom walls within the area of the flow sockets must be cut away between crimps for access to the cells D. Similarly also, the counterflow enters at the bottom at E and passes through cells F and leaves at the top. Therefore the top and bottom walls within the area of the counterflow sockets must also be cut away between crimps for access to the F cells. The top and bottom walls at 87 and 88 between crimps are bent up to make the joint as indicated. By making the cells narrow, intimate contact between the air and the wall can be secured, and by making the walls thin and of high conductivity a high rate of heat exchange can be secured.

Figs. 5 and 6 illustrate one form of dehumidifier. Arrows and circles, as above, indicate the direction of flow. Induction air entering at inlet 76 is distributed to passages 77 over the troughs of adsorbent 71 and passes therethrough to passages 78 whence it is conducted to outlet 75. Eduction air entering at inlet 73 is distributed to passages 72 passing in close contact to the troughs of adsorbent, whence it is conducted to outlet 76. Through these same passages are conducted the hot gases from the furnace 58 when the apparatus is reactivating. The construction of the dehumidifier is shown similar to that of the heat exchanger by providing crimps where it is necessary to make joints of one sheet to another, but any suitable method of construction may be adopted.

In drying air by absorption (this term herein includes adsorption) of moisture therefrom into an absorbent, the efficiency of absorption decreases as the absolute humidity of air to be treated increases. That is, an absorber which will remove for instance fifty percent of the water content of air at a certain absolute humidity will not remove fifty per cent of the water content of air at an absolute humidity higher than that certain amount even though a greater quantity of water is removed. In an absorber, air is passed over or through beds of absorbent material, or passed through sprays or baths of liquid absorbent. The amount of reduction in absolute humidity cannot be increased by increasing the area of the path of flow of air in contact with absorbent in any direction except the direction of air flow. This results in increased resistance to flow.

In an evaporative cooling system, for instance, like that described above in connection with Fig. 1, a certain rate of air flow is required to effect a desired evaporative cooling and to maintain a desired humidity in a room to be conditioned. Also, the air must be dry to a certain humidity to effect the desired lowering of temperature by the evaporative cooling. Therefore, a system of this type would not be within the realm of practical possibility for atmosphere at high absolute humidity (which reaches as high as 175 grains per pound at 95 degrees dry bulb temperature and 70 per cent relative humidity) were it not for my improvement of supplying room air, i. e., recirculated air to the absorber so that the absolute humidity of air to be dried may be below that of the atmosphere even when the humidity of the atmosphere is far above that of room air. This not only permits of actual performance when the absolute humidity of atmosphere is very high, but also permits of the desired performance with a given absorber uninterrupted by increase in the absolute humidity of the atmosphere above that of room air.

Having described my invention and the operation thereof, I desire to secure by Letters Patent the following claims:

1. In an air conditioning apparatus for both hot and cold weather, the combination of a heating apparatus, duplicate absorbent dehumidifying units, means for passing humid air through one dehumidifying unit and simultaneously passing heat from said heating apparatus through the other dehumidifying unit, and vice versa, means for cooling the dehumidified air by passing it through one element of a heat exchanger, further humidifying it and repassing a portion of it back through the other element of said heat exchanger, means for passing another portion of it to an enclosure to condition same and means for bypassing both said dehumidifying units and for simultaneously passing heat from the heating apparatus to the second named element of the heat exchanger instead of to the dehumidifying units.

2. In combination for the purpose of air conditioning an enclosure, a plurality of adsorbers, a heat exchanger, a humidifying spray for adjusting the humidity desired in said enclosure, a plurality of humidifying sprays for said heat exchanger, and ducts for conveying a mixture of air from said enclosure and from outdoors to and through the desired adsorbers, to and through one set of passages of said heat exchanger, to and through the first mentioned humidifying spray, and thence, one part of said mixture back to said enclosure and another part of said mixture to and through the plurality of humidifying sprays and the counter passages of the heat exchanger, with means for causing a flow of air through said ducts and apparatus.

3. The improvement in air conditioning a room which consists in placing the room in a closed conduit circuit, extracting moisture by absorption from air leaving the room so that the air to be thus treated may be at an absolute humidity below that of the atmosphere to permit of the necessary efficiency of moisture absorption to effect a desired subsequent evaporative cooling of the air even when the absolute humidity of the atmosphere is above that of room air, withdrawing a part of the dehumidified air from the circuit, evaporating water into the withdrawn air and utilizing the cooling effect of evaporation to cool the air which is dehumidified.

4. In an air conditioning system, a room, an absorption type dehumidifier, means to conduct air from said room to said dehumidifier, the air being conducted from the room to the dehumidifier so that the air to be dehumidified may be at an absolute humidity below that of the atmosphere to permit the necessary efficiency of moisture absorption to effect a desired subsequent evaporative cooling of the air even when the absolute humidity of the atmosphere is above that of room air, a heat exchanger having separate spaces including a first space and a second space, means to conduct air from said dehumidifier to said first space, means to conduct air from said first space to said second space, means to spray water into the last-mentioned air for evaporative cooling thereof and means to conduct air from said first space to said room.

5. In an air conditioning system, a room, a plurality of absorption type of dehumidifying elements, a heat exchanger having separate spaces including a first space and a second space, means to conduct air from said room through one of said dehumidifying elements and to said first space, the air being conducted from the room to the dehumidifying element so that the air to be dehumidified may be at an absolute humidity below that of the atmosphere to permit the necessary efficiency of moisture absorption to effect a desired subsequent evaporative cooling of the air even when the absolute humidity of the atmosphere is above that of room air, means to pass hot air through another of said dehumidifying elements, means to conduct air from said first space to said second space, means to spray water into the last-mentioned air for evaporative cooling thereof, and means to conduct air from said first space to said room.

6. In an air conditioning system, a room, a plurality of absorption type of dehumidifying elements, a heat exchanger having separate spaces including a first space and a second space, means to conduct air from said room through one of said dehumidifying elements and to said first space, the air being conducted from the room to the dehumidifying element so that the air to be dehumidified may be at an absolute humidity below that of the atmosphere to permit the necessary efficiency of moisture absorption to effect a desired subsequent evaporative cooling of the air even when the absolute humidity of the atmosphere is above that of room air, means to pass hot air through another of said dehumidifying elements, means to conduct air from said first space to said second space, means to spray water into the last-mentioned air, means to conduct air from said first space to said room, and said spaces being arranged and connected for counter-flow of heat exchange fluids.

7. In an air conditioning system, a room, a plurality of dehumidifying elements, a heat exchanger having separate spaces including a first space and a second space, means to conduct air from said room through one of said dehumidifying elements and to said first space, means to pass hot air through another of said dehumidifying elements, means to conduct air from said first space to said second space, means to spray water into the last-mentioned air, means to conduct air from said first space to said room, said spaces being arranged and connected for counter-flow of heat exchange fluids, and means to spray water at a plurality of places into said second space.

8. In an air conditioning system, a room, an absorber for removing water vapor from air, a heat exchanger having two sets of passages for air, members for conducting air from said room through said absorber then through one of said sets of heat exchanger passages and back to said room, members for conducting some of the air after passage through said one set of heat exchanger passages through the other of said sets of heat exchanger passages and then to rejection, the flow of air being counter-current in said sets of heat exchanger passages, and means for evaporating water in the air substantially throughout the extent of said other set of heat exchanger passages.

9. An air conditioning system including an absorber, a heat exchanger having two sets of passages, a room, said absorber comprising beds of moisture absorbing material and air ducts for cooling the beds, members for conducting air through said absorber and then through one set of said heat exchanger passages to said room, members for conducting some of the air after passage through said one set of heat exchanger passages through the other of said sets of passages and then through said absorber cooling ducts to rejection, and means for evaporating water in the air in said other set of heat exchanger passages and said exchanger cooling ducts.

10. A method of air conditioning which includes dehumidifying and reducing the heat content of air by absorbing water vapor therefrom into an absorbent and transferring heat of absorption to a portion of the dehumidified air, and conducting another portion of the dehumidified air to an enclosure to be conditioned, the said heat transfer being carried out by evaporation of water in said first portion of the dehumidified air in thermal exchange relation with all of the dehumidified air and also in thermal exchange relation with the absorbent.

11. A method of air conditioning which includes reducing the water vapor tension of air by absorption of water vapor into an absorbent, evaporating water into a portion of the treated air, conducting another portion of the treated air to an enclosure to be conditioned, and conducting that portion into which water is evaporated in thermal exchange relation with the absorbent.

12. A method of air conditioning which includes withdrawing air from an enclosure to be conditioned, mixing the withdrawn air with an amount of atmospheric air, dehumidifying and reducing the heat content of said mixture of air by absorbing water vapor therefrom into an absorbent and transferring heat of absorption to a portion of the dehumidified air, and conducting another portion to said enclosure, the said heat transfer being carried out by evaporation of water in said first portion of the dehumidified air in thermal exchange relation with all of the dehumidified air and also in thermal exchange relation with the absorbent.

13. A regenerative cooling system comprising a heat interchanger unit including means for effecting a continuous recirculation of a cooling liquid therethrough and means for effecting atomization of the liquid at one point in its path of circulation, means for causing inflow of a stream of outside air through the heat interchanger for cooling thereby, and means for dividing the stream of air after passing the heat interchanger and for directing one portion of the cooled air through the atomized liquid and the other part through an area to be cooled, and back into the air stream inflowing to the heat interchanger.

14. The method of cooling an enclosed area which comprises cooling a stream of air by passing it through a heat interchanger, effecting the circulation of a cooling liquid through the heat interchanger in a closed circuit including an evaporator chamber, dividing the cooled air stream at the outlet side of the heat interchanger and diverting one part thereof through the area to be cooled and back into the air stream at the intake side of the heat interchanger and diverting the other part through the evaporator chamber.

15. The method of cooling which comprises causing a cooling liquid to be circulated in a circuit including a heat interchanger and an evaporator chamber, the cooling liquid passing through the evaporator chamber in an atomized state, causing a stream of air entering at constant dew point to flow through the heat interchanger for cooling thereby to a degree below the wet bulb temperature of the entering air, then dividing the cooled air stream and diverting one part through the area to be cooled and back into the entering air stream and diverting the other part through the evaporator chamber for intimate contact with the atomized water utilized in the cooling circuit of the heat interchanger.

16. A regenerative cooling system comprising, means for effecting a continuous circulation of liquid, means for effecting atomization of the liquid at one point in its path of circulation, a heat exchange passage, means for causing inflow of a stream of outside air through said passage for cooling therein, means for dividing the stream of air after passing through said passage and for directing one portion of the cooled air through the atomized liquid and the other part through an area to be cooled, and back into the air stream inflowing to said passage, and means to transfer cold produced by the atomization to the air in said passage.

17. The method of cooling an enclosed area which comprises, cooling a stream of air by passing it through one space of a heat exchanger, effecting the circulation of a liquid in a closed circuit including an evaporator chamber, dividing the cooled air stream at the outlet side of the heat interchanger and diverting one part thereof through the area to be cooled and back into the air stream at the intake side of the heat exchanger and diverting the other part through the evaporator chamber, and transfering cold from the evaporator chamber to another space of the heat exchanger to effect said cooling.

18. The method of cooling which comprises, causing a liquid to be circulated through an evaporator chamber in an atomized state, causing a stream of air entering at constant dew point to flow through one space of a heat interchanger for cooling therein to a degree below the wet bulb temperature of the entering air, then dividing the cooled air stream and diverting one part through the area to be cooled and back into the entering air stream and diverting the other part through the evaporator chamber for intimate contact with the atomized water, and transferring cold from the evaporator chamber to a second space of the interchanger to effect the cooling.

19. A regenerative cooling system comprising, a heat interchanger having a first space and a second space in heat transfer relation, means for causing inflow of a stream of outside air through said first space, means for dividing the stream of air after passing the heat interchanger, means for effecting atomization of liquid, means for directing one portion of the divided cooled air through the atomized liquid and the other part through an area to be cooled and back into the air stream inflowing to the heat interchanger, and means for circulating cooled fluid from the place of atomization through said second space of the heat interchanger.

20. The method of cooling an enclosed area which comprises, cooling a stream of air by passing it through a heat interchanger, effecting circulation of a cooling liquid through an evaporator chamber, dividing the cooled air stream at the outlet side of the heat interchanger and diverting one part thereof through the area to be cooled and back into the air stream at the intake side of the heat interchanger and diverting the other part through the evaporator chamber, and circulating cooled fluid from the evaporator chamber through the heat interchanger.

21. A regenerative cooling system including means for effecting a continuous circulation of liquid in a path of flow, a first heat exchange passage, a second heat exchange passage out of thermal transfer relation with said first passage, means for causing movement of a stream of air through said passages in series respectively, means for dividing air from said stream between said passages and directing the divided portion of the air into an area to be cooled, means for effecting atomization of said circulating liquid in the presence of air in said stream before the latter enters said second heat exchange passage, means to transfer cold produced by the evaporation of the atomized liquid to cool the air in said first passage, and means for effecting cooling of said circulating liquid by the air in said second passage.

22. A system as in claim 21 wherein means is provided for delivering air from the area to be cooled back into the air stream inflowing to said first passage.

BENNET CARROLL SHIPMAN.